(12) United States Patent
Conroy et al.

(10) Patent No.: US 6,459,684 B1
(45) Date of Patent: Oct. 1, 2002

(54) MULTIPLEXED CODEC FOR AN ADSL SYSTEM

(75) Inventors: Cormac S. Conroy, Sunnyvale, CA (US); Samuel W. Sheng, Santa Clara, CA (US); Gregory T. Uehara, Honolulu, HI (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/250,426

(22) Filed: Feb. 16, 1999

Related U.S. Application Data (60) Provisional application No. 60/104,256, filed on Oct. 14, 1998.

(51) Int. Cl.[7] .............................. H04B 3/20; H04J 1/02; H04M 9/08
(52) U.S. Cl. ....................... 370/286; 370/494; 370/208; 379/410
(58) Field of Search ................................. 370/203, 208, 370/210, 484, 493, 494–485, 486, 286–289; 375/260, 222; 379/406, 407, 410; 341/155

(56) References Cited

U.S. PATENT DOCUMENTS

| | | | | |
|---|---|---|---|---|
| 5,512,898 A | * | 4/1996 | Norsworthy et al. | 375/222 |
| 5,673,290 A | * | 9/1997 | Cioffi | 375/260 |
| 5,742,527 A | * | 4/1998 | Rybicki et al. | 370/484 |
| 5,812,786 A | * | 9/1998 | Seazholtz et al. | 395/200.63 |
| 5,889,856 A | | 3/1999 | O'Toole et al. | 379/399 |
| 5,960,036 A | * | 9/1999 | Johnson et al. | 375/222 |
| 6,005,873 A | * | 12/1999 | Amit | 370/494 |
| 6,005,893 A | * | 12/1999 | Hyll | 375/260 |
| 6,028,867 A | * | 2/2000 | Rawson et al. | 370/493 |
| 6,028,891 A | * | 2/2000 | Ribner et al. | 375/222 |

OTHER PUBLICATIONS

Conroy, Cormac, et al., "A CMOS Analog Front–End IC for DMT ADSL", 1999 IEEE International Solid–StateCircuits Conference, 0–7803–5129–0/99.

* cited by examiner

*Primary Examiner*—Steven Nguyen
*Assistant Examiner*—Phuongchau Ba Nguyen
(74) *Attorney, Agent, or Firm*—Lathrop & Gage, L.C.

(57) ABSTRACT

An ADSL central office transmission system for transmitting downstream DMT signals to a plurality of remote ADSL transceiver is disclosed. The system includes a DMT digital signal transceiver that generates a time division multiplexed digital signal that includes a plurality of DMT signals to be sent on a plurality of ADSL lines. A digital to analog converter converts the time division multiplexed digital signal into a time division multiplexed analog signal that includes a plurality of analog DMT signals. The analog to digital converter has an output that outputs the time division multiplexed analog signal. A switch selectively connects the output of the digital to analog converter to each of a plurality of transmitters. The transmitters are configured to drive the plurality of ADSL lines. Thus, the plurality ADSL lines are driven by the plurality of analog DMT signals.

24 Claims, 5 Drawing Sheets

MULTIPLEXED CODEC FOR AN ADSL SYSTEM

This application claims priority to U.S. Provisional Patent Application No. 60/104,256 filed Oct. 14, 1998, which is incorporated herein by reference for all purposes.

BACKGROUND OF THE INVENTION

1. Field of the Invention

The present invention relates generally to communication systems. More specifically, a multiplexed CODEC for an ADSL central office is disclosed that processes signals sent and received on multiple data lines. In addition, a multiplexed CODEC is disclosed for an ADSL remote unit that generates a data signal for sending an upstream signal to the central office as well as an echo cancellation signal that is used to process an incoming downstream signal from the central office. A multiplexed CODEC at the ADSL remote unit also is disclosed that may be used to process both ADSL signals and voice band modem POTS signals.

2. Description of the Related Art

Asymmetric Digital Subscriber Line (ADSL) technology is used to deliver high-rate digital data over existing phone lines without modification of the phone lines. A modulation scheme called Discrete Multitone (DMT) allows the transmission of high speed digital data. ADSL facilitates the simultaneous use of normal telephone services, ISDN, and high speed data transmission. ADSL allows a large bandwidth (1.104 MHz) for transmission in a downstream direction from a central office to a subscriber in a remote location and a lesser bandwidth (138 kHz) for transmission in an upstream direction from a subscriber in a remote location to a central office. ADSL systems are described further in the ADSL T1E1.413 standard, which is herein incorporated by reference for all purposes.

Figure 1A:
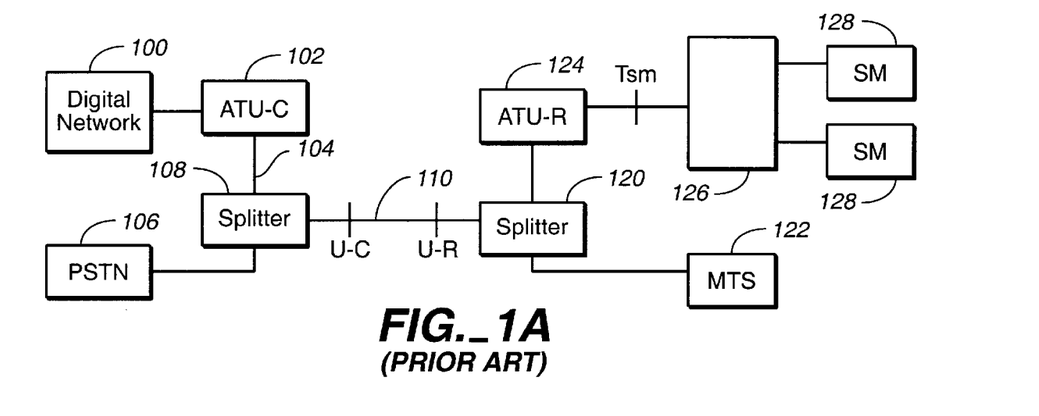
FIG. 1A illustrates the architecture of an ADSL system.

FIG. 1A illustrates the architecture of an ADSL system. A digital network 100 provides data that is to be sent downstream over the ADSL line. The data is delivered to an ADSL transceiver unit in a central office (an ATU-C) 102. The ATU-C modulates data for downstream transmission using a DMT scheme. ATU-C drives a line 104 with an analog signal. Line 104 is connected to a telephone line 110 that is part of a Public Switched Telephone Network (PSTN) 106 by a splitter 108. ATU-C also receives data transmitted in the upstream direction on line 104.

At the receiver end, a splitter 120 splits the signal on line 110 between a message telecommunication service (MTS) 122 (also referred to as plain old telephone service (POTS)) and an ADSL transceiver unit line for a remote unit (an ATU-R) 124. ATU-R 124 is connected to one or more service modules (SM) 128 by a bus 126. The ATU-R demodulates data transmitted by the ATU-C in the downstream direction and also transmits data in the upstream direction.

Figure 1B:
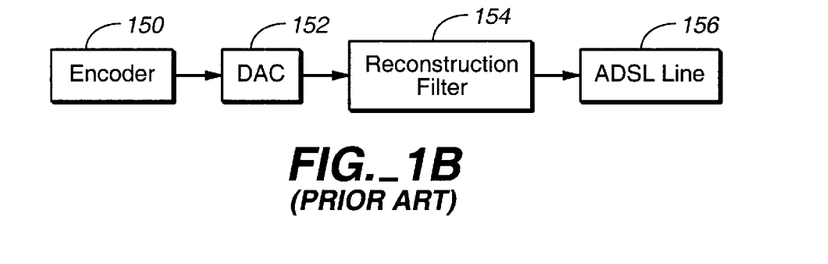
FIG. 1B is a block diagram illustrating the transmission path of an ADSL system.

FIG. 1B is a block diagram illustrating the transmission path of an ADSL system. The transmission path may be in either the upstream or the downstream direction. An encoder 150 sends digital data to a DAC 152. The analog output of DAC 152 represents an ADSL modulated signal that is to be transmitted on an ADSL line. The analog output of DAC 152 is therefore directed to a reconstruction filter 154. Reconstruction filter 154 reconstructs the signal that is to drive an ADSL line 156. Usually, there is an additional line driver in the signal path. Thus, the signal that drives ADSL line 156 is first generated digitally by encoder 150. DAC 152 converts the digital signal to an analog signal and reconstruction filter 154 drives the ADSL line.

Figure 1C:
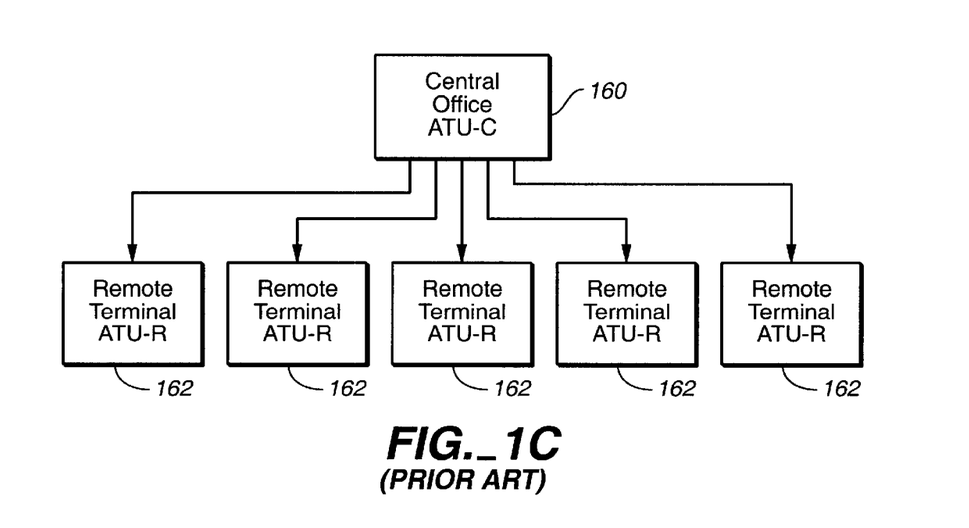
FIG. 1C is a block diagram illustrating an asymmetric digital subscriber line (ADSL) system that includes a central office and several remote terminals.

FIG. 1C is a block diagram illustrating an asymmetric digital subscriber line (ADSL) system that includes a central office 160 and several remote terminals 162. Typically, the central office includes a large number of lines extending to a large number of remote terminals. For economic reasons, it is desirable that the central office be able to accommodate as many lines as possible. A number of factors limit how many lines may be supported in a central office building. A major factor is the ability of the building to dissipate sufficient heat so that the heat generated by the ADSL transceiver and modulation hardware does not cause systems to fail. Therefore, it is important to design systems so that the power dissipated per line to a remote terminal is minimized, making it possible to maximize the number of lines included in a central office building.

One approach to increasing the number of lines that can be included in a central office is to design ADSL central office chip sets with multiple line architectures. Including circuitry for more than one line on a chip may have the advantage of reducing the amount of heat generated for each line in the central office as well as reducing manufacturing costs.

Figure 2:
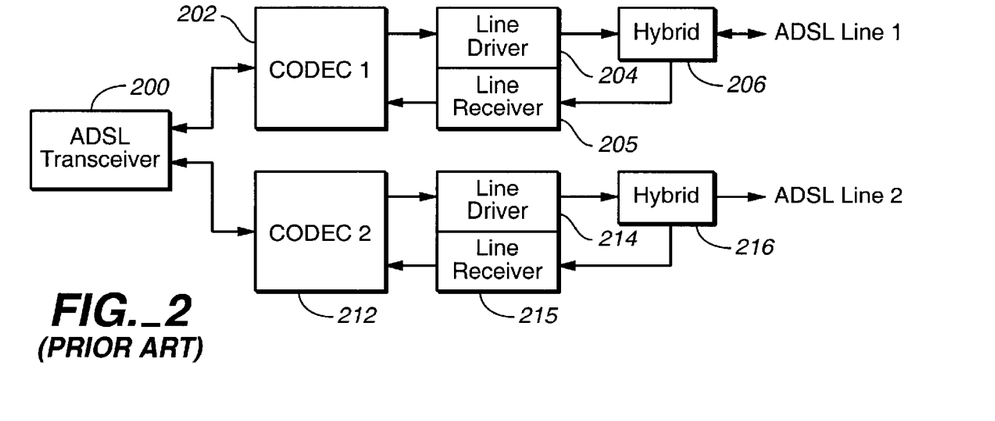
FIG. 2 is a block diagram illustrating a prior art system that includes a multiple line ADSL transceiver that generates downstream transmitted ADSL signals on two ADSL lines.

FIG. 2 is a block diagram illustrating a prior art system that includes a multiple line ADSL transceiver that generates downstream transmitted ADSL signals on two ADSL lines. An ADSL transceiver 200 transmits and receives ADSL signals to and from a CODEC 202. In the downstream direction, CODEC 202 converts a digital signal from the ADSL transceiver to an analog signal and sends the analog signal to a line driver 204. Line driver 204 generates an analog modulation signal that can be applied to the first ADSL line supported by the ADSL transceiver. The output from the line driver is input to a hybrid 206. Hybrid 206 is connected to the ADSL line usually through a transformer.

Incoming upstream signals from the ADSL line are transferred by hybrid 206 to a line receiver driver 205. The analog signals from line receiver 205 in the upstream direction are converted to digital signals by CODEC 202 and those digital signals are input to the ADSL transceiver 200. In the same manner, for the second line supported by ADSL transceiver 200, digital signals from the ADSL transceiver are converted to analog signals in the downstream direction by a CODEC 212. Analog signals from CODEC 212 are input to line driver 214 which drives the second ADSL line through hybrid 216. Also, incoming upstream signals from ADSL line 2 are input to the hybrid 216 which transfers the signals to line receiver 215 so that they may be converted to digital signals by CODEC 212. The digitized signals from CODEC 212 are input to the second ADSL port of ADSL transceiver 200.

The benefit of this architecture is that a single ADSL transceiver may be used for two lines instead of requiring an ADSL transceiver for each line. It would also be useful if the number of other chips in the chip set could be reduced as well. For example, one line driver and CODEC is required for each ADSL line. If a system could be designed that would allow such chips to support more than one ADSL line, then further power and cost saving could be realized.

SUMMARY OF THE INVENTION

Accordingly, a system and method for sending and receiving ADSL signals for more than one ADSL line at an ATU-C is disclosed that requires only a single CODEC for multiple lines. Signals output from an ADSL transceiver are time division multiplexed and input into a single CODEC. The output of the CODEC is switched and sent to different line drivers for each of the lines associated with the transceiver. Similarly, in the upstream direction, multiple lines are connected through receivers to the CODEC and the CODEC samples each of the lines alternatively and interleaves the digitized data on a signal digital output to the transceiver. In addition, a system and method implemented at an ATU-R is disclosed that also includes a multiplexed CODEC. The multiplexed CODEC is used to receive an ADSL transmission and also process an echo canceling signal in some embodiments. The multiplexed CODEC is also used to process a modem signal from a POTS line in some embodiments.

It should be appreciated that the present invention can be implemented in numerous ways, including as a process, an apparatus, a system, a device, a method, or a computer readable medium. Several inventive embodiments of the present invention are described below.

In one embodiment, an ADSL central office transmission system for transmitting downstream DMT signals to a plurality of remote ADSL transceiver is disclosed. The system includes a DMT digital signal transceiver that generates a time division multiplexed digital signal that includes a plurality of DMT signals to be sent on a plurality of ADSL lines. A digital to analog converter converts the time division multiplexed digital signal into a time division multiplexed analog signal that includes a plurality of analog DMT signals. The digital to analog converter has an output that outputs the time division multiplexed analog signal. A switch selectively connects the output of the digital to analog converter to each of a plurality of transmitters. The transmitters are configured to drive the plurality of ADSL lines. Thus, the plurality ADSL lines are driven by the plurality of analog DMT signals.

In another embodiment, a method of transmitting a plurality of downstream DMT signals from a central office is disclosed. The method includes generating a time division multiplexed digital signal that includes a plurality of digital DMT signals. The time division multiplexed digital signal is converted into a time division multiplexed analog signal that includes a plurality of analog DMT signals. The time division multiplexed analog signal is selectively connected to each of a plurality of transmitters and a plurality of ADSL lines are driven with the plurality of transmitters.

In another embodiment, an ADSL remote transceiver for receiving DMT signals from a central office and for transmitting DMT signals to the central office is disclosed. A DMT digital signal encoder generates a digital DMT signal to be sent to the central office. A digital to analog converter inputs the digital DMT signal to be sent to the central office. The digital to analog converter has a digital to analog converter output that outputs an analog transmission signal for transmission to the central office. An analog echo cancellation signal cancels echoes caused by leakage from the analog transmission signal in a received signal from the central office. Thus, a transmission signal is generated for sending data to the central office and an echo cancellation signal is generated for correcting errors in the received signal.

In another embodiment, a method of receiving DMT signals from a central office and for transmitting DMT signals to the central office is disclosed. The method includes generating a digital DMT signal to be sent to the central office. A digital DMT signal to be sent to the central office is converted to an analog DMT transmission signal and to an analog echo cancellation signal for correcting errors caused by leakage from the analog DMT transmission signal in a received signal from the central office. A time division multiplexed analog output is generated that includes the analog DMT transmission signal and the analog echo cancellation signal. The time division multiplexed analog output is selectively connecting to an ADSL transmission line and to an echo cancellation circuit.

In another embodiment, a remote unit is configured to transmit both an ADSL signal and a POTS modulated signal. The remote unit includes a DAC having an input and an output and a DMT encoder selectively connected to the input of the DAC. A POTS modem encoder is selectively connected to the input of the DAC in a complementary manner such that when the DMT encoder is connected to input of the DAC, the POTS modem encoder is not connected to the input of the DAC and when the POTS modem encoder is connected to the input of the DAC the DMT encoder is not connected to the input of the DAC. An ADSL transmitter and a POTS modem are selectively connected to the output of the DAC so that when the DMT encoder is connected to the input of the DAC, the ADSL transmitter is connected to the output of the DAC and when the POTS modem encoder is connected to the input of the DAC, the POTS modem is connected to the output of the DAC.

In another embodiment, a remote unit is configured to receive both a DMT signal from an ADSL central office and a modulated POTS signal. The remote unit includes an ADC having an input and an output and an ADSL line selectively connected to the input of the ADC. A POTS line is selectively connected to the input of the ADC in a complementary manner such that when the ADSL line is connected to input of the ADC, the POTS line is not connected to the input of the DAC and when the POTS line is connected to the input of the ADC, the ADSL line is not connected to the input of the ADC. An ADSL processor and a modem processor selectively connected to the output of the ADC so that when the ADSL line is connected to the input of the ADC, the ADSL processor is connected to the output of the ADC and when the POTS line is connected to the input of the ADC, the modem processor is connected to the output of the DAC.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention is described below in an embodiment that processes ADSL signals such as are specified in ITU Standard G.992.1, which is herein incorporated by reference for all purposes. In addition, the invention may be used with ADSL-lite signals such as are specified in ITU Standard G.992.2, which is herein incorporated by reference for all purposes. It should be appreciated that the invention is also useful for processing other DSL signals such as HDSL or SDSL. In addition, the architecture and method is also useful for processing signals conforming to other modulation schemes such as Home phone network alliance (Home PNA) signals.

Figure 3A:
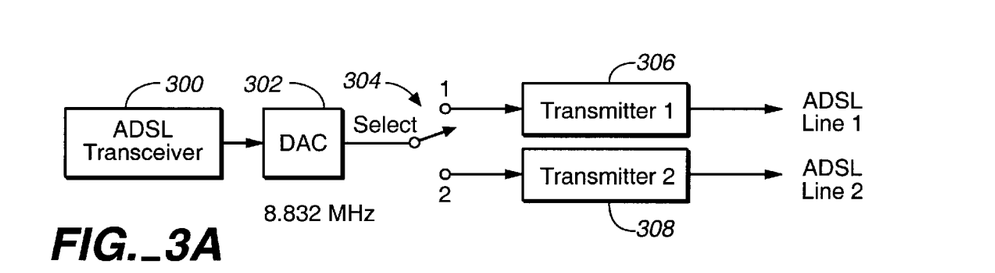
FIG. 3A is a block diagram illustrating a central office transmission path that includes two independent ADSL lines.
Figure 4A:
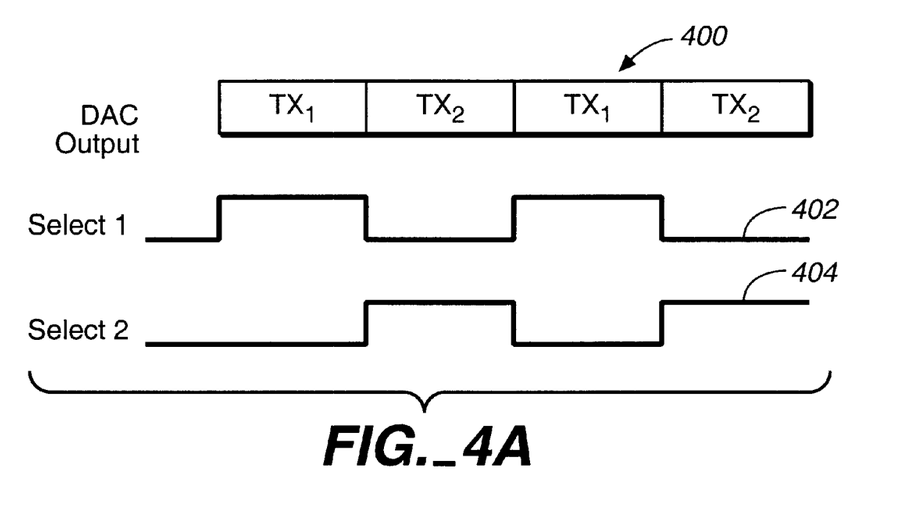
FIG. 4A is a timing diagram showing the DAC output and the state of the switch shown in FIG. 3A.

FIG. 3A is a block diagram illustrating a central office transmission path that includes two independent ADSL lines. An ADSL transceiver 300 outputs a signal to a DAC 302. DAC 302 is configured to receive a signal from the ADSL transceiver that includes time division multiplexed modulation code for two different ADSL lines. ADSL transceiver 300 may include one or more DMT signal encoders that generate DMT signals. Alternatively, two ADSL transceivers could be used with a combiner that interleaves the two DMT signals into a time division multiplexed signal. The time division multiplexed signal may be generated by a single transmitter or multiple transmitters and combined by a time division multiplexer that receives multiple signals and combines them into a time division multiplexed signal. DAC 302 outputs an analog signal that is time division multiplexed as is shown in FIG. 4A. The output of DAC 302 is sent to a switch 304. Switch 304 alternately connects DAC 302 to a first transmitter 306 and a second transmitter 308. The timing diagram for switch 304 is also illustrated in FIG. 4A. A first selected output of switch 304 is connected to a first transmitter 306 and a second selected output of switch 304 is connected to a second transmitter 308. The transmitters are each connected to a separate ADSL line. It should be noted that the transmitters generally include a reconstruction filter that conditions the output of the DAC for transmission over an ADSL line.

According to the ADSL standard, the downstream transmission bandwidth is 1.104 MHz on each line. In one embodiment, the DAC is selected to run at four times the bandwidth which is twice the Nyquist limit of two times the bandwidth. Thus, to produce two time division multiplexed signals, the DAC runs at 8.832 MHz. It should be noted that in the example given above, a single DAC is used to produce the analog signals for two ADSL lines. In other embodiments, a single DAC may be used to generate signals for more than two ADSL lines. For example, the 8.832 MHz DAC could be used to generate up to four ADSL lines in a system where the Nyquist limit is used. However, it is generally preferred to use a DAC that outputs data at greater than the minimum theoretical possible frequency. If the criteria that the DAC output rate be at least twice the minimum theoretical limit or four times the bandwidth signal is maintained, then additional ADSL lines could be added to the architecture described by increasing the speed of the DAC.

Figure 3B:
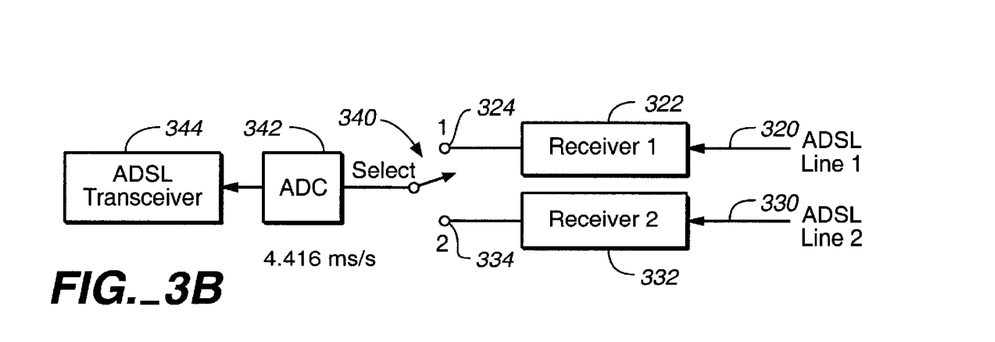
FIG. 3B is a block diagram illustrating a receive path for an ADSL central office that includes two ADSL lines.

FIG. 3B is a block diagram illustrating a receive path for an ADSL central office that includes two ADSL lines. The signal from a first ADSL line 320 is input to a receiver 322. A second ADSL line 330 is input into a second receiver 332. The output of receiver 322 is at a node 324. The output of receiver 332 is at a node 334. A switch 340 selects between node 324 and 334 as the input to an analog to digital converter (ADC) 342. The output of analog to digital converter 342 is input to an ADSL transceiver 344.

Thus, the analog to digital converter is used to digitize the received analog signals from two ADSL lines by alternating the line used as the input to the ADC using switch 340. A timing diagram for switch 340 is provided in FIG. 4B along with a plot of the signal digitized by ADC 342.

It should be noted that in one embodiment, ADC 342 and DAC 302 are both included in a single CODEC.

The data bandwidth in the upstream direction received by the central office is less than the bandwidth in the downstream direction. In the United States, the standard is 138 kHz bandwidth in the upstream direction and in Europe using ISDN lines, the standard is 276 kHz. Again, using the criteria that the ADC will sample at twice the minimum theoretical Nyquist limit, the ADC is set to sample the signal at least four times the bandwidth of the upstream data. In one embodiment, an ADC that samples at 4.416 megasamples per second is used, which is well within this criteria. When such an ADC is used, it would be possible to receive signals from greater than two lines and to use a switch that switches between those lines.

It should be noted that the output of the DAC may be re-sampled and/or sent through a reconstruction filter and/or sent through a programmable gain amplifier or programmable attenuator prior to being input to a transmitter. When the DAC is described as being connected to a transmitter, it should be understood that such a connection may be direct or indirect. FIG. 4A is a timing diagram showing the DAC output and the state of switch 304 from FIG. 3A. DAC output 400 includes analog data for transmitter one interleaved with data for transmitter two. The data for the two transmitters is thus time division multiplexed. A select signal 402 is shown which is high when the switch is connected to the first transmitter. The select signal is synchronized with the DAC output so that it is high when data for transmitter one is output from the DAC. Likewise, a select signal 404 is shown which is high when switch 304 is connected to the input of transmitter 308. Select signal 404 is high when data for transmitter two is output by the DAC.

Figure 4B:
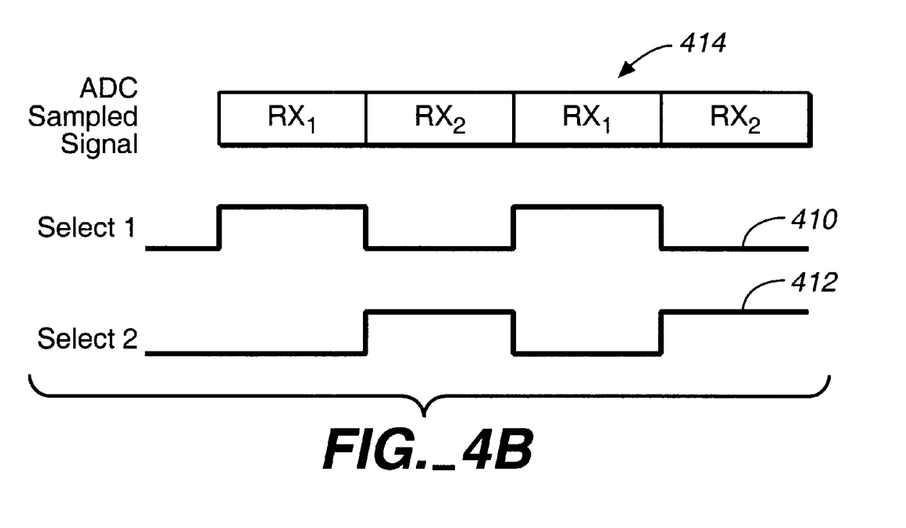
FIG. 4B shows the ADC sample signal and the state of switch 340 shown in FIG. 3B.

FIG. 4B shows the ADC sample signal and the state of switch 340 in FIG. 3B. A select signal 410 is high when switch 340 is connected to the output of receiver one. When select signal 410 is high, the ADC sample sign al corresponds to the signal from receiver one. Similarly, a select signal 412 is high when switch 340 is connected to receiver two. The ADC sampled signal 414 corresponds to receiver two when select signal 412 is high.

Figure 5A:
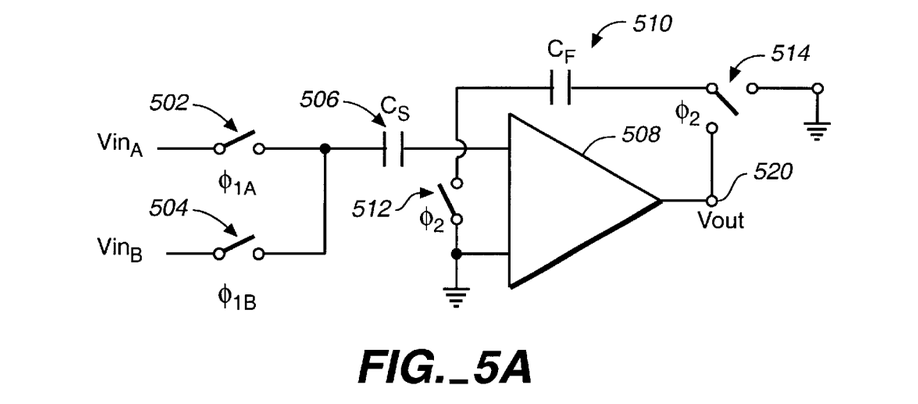
FIG. 5A is a block diagram illustrating how two upstream signals are switched to be sampled by a single analog to digital converter in a central office.
Figure 5B:
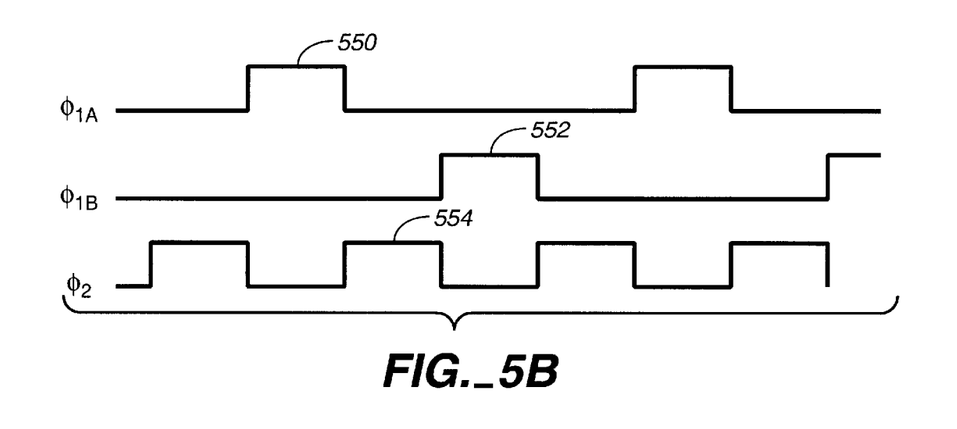
FIG. 5B shows timing diagrams for the switches shown in FIG. 5A.

FIG. 5A is a block diagram illustrating how two upstream signals are switched to be sampled by a single analog to digital converter in a central office. A first switch 502 and a second switch 504 are connected to separate voltages generated from separate ADSL lines carrying signals in the upstream direction to the central office. FIG. 5B shows timing diagrams for the switches shown in FIG. 5A. Switches 502 and 504 are alternatively closed so that the voltage on the corresponding lines are alternatively applied to a sampling capacitor 506. Sampling capacitor 506 is connected to an amplifier 508. Switch 502 is closed when signal 550 is high and switch 504 is closed when signal 552 is high.

The feedback loop for amplifier 508 includes a capacitor 510, a switch 512 and a switch 514. A timing diagram for switches 512 and 514 is shown as signal 554. When signal 554 is high, the switches are closed to close the feedback loop. When signal 554 is low, switch 512 is open and switch 514 is connected to artificial ground. Thus, the two analog inputs may be multiplexed and applied to an analog to digital converter so that they may be both digitized by the same analog to digital converter. The output is taken at a node 520 located at the output of the amplifier.

Thus, a single DAC and ADC (which may be implemented as a single CODEC) may be used to transmit signals on two separate ADSL lines and to receive signals from two separate ADSL lines by using time division multiplexing. As noted above, in other embodiments, more than two lines may be used by selecting appropriate sampling rates for the ADC and output frequencies for the DAC. Thus, a single CODEC may be used for two lines in the central office, saving chip cost as well as requiring less power distribution.

Similar advantages can be realized by providing a single CODEC for processing both the transmit and echo cancellation signals in a remote ADSL chip set, although the remote ADSL receiver/transmitter that receives downstream ADSL signals and transmits upstream ADSL signals need not implement multiple lines using a single chip or chip set because a remote unit generally is connected to only one ADSL line. Also, power distribution issues are not as important at a remote station. However, it is possible to reduce chip costs by using a single DAC to output an analog signal for transmission to the central office as well as an analog signal derived from that transmission used to correct error caused by leakage of the transmitted signal into the received signal path through a hybrid.

For ADSL systems using echo cancellation, the upstream and downstream bands overlap, and it is necessary for the ADSL chip at a remote station to generate for the receive signal an echo cancellation signal that is derived from the signal being transmitted for the purpose of canceling out leakage of the transmitted signal into the received signal path. The ADSL signals in both the upstream and downstream direction are both transmitted on the same line. A hybrid network is used by the remote unit to isolate the transmitter from the receiver so the signal being transmitted does not interfere with the received signal. However, it is generally not feasible to use a hybrid that is completely effective over the entire bandwidth used for ADSL for every line used. In particular, variance in line characteristics presents a problem. As a result, some leakage from the transmission line to the receive line does occur.

This leakage is modeled digitally and an echo cancellation processor inputs the output code and generates an echo cancellation signal designed to cancel out the leakage of the transmitted signal to the received line. Conventionally, a second digital to analog converter independent of the digital analog converter used to generate the transmitted signal is used to generate the analog echo cancellation signal that is added to the incoming received signal for the purpose of canceling leakage from the transmitted signal through the hybrid. It would be desirable if the analog echo cancellation signal could be generated by the same digital to analog converter that is used to generate the transmitted signal.

Figure 6A:
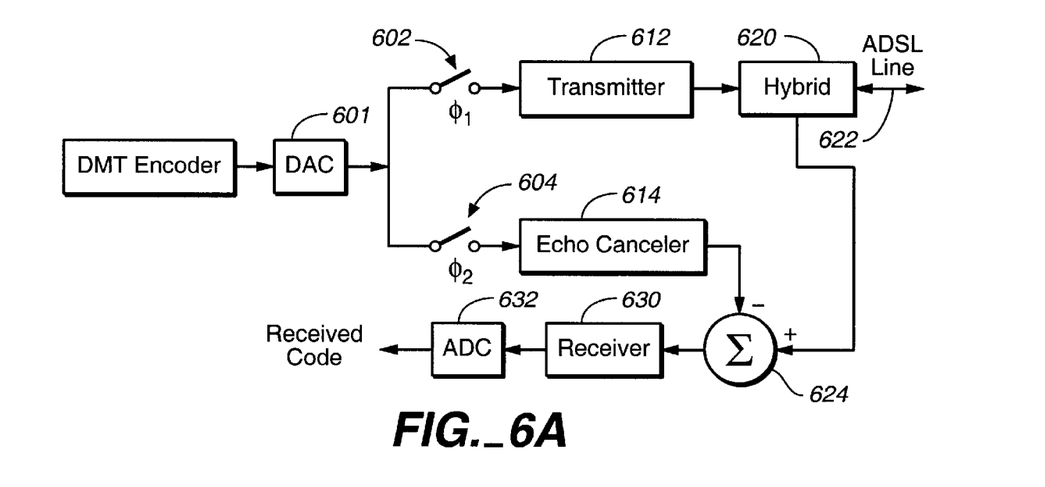
FIG. 6A is a block diagram illustrating the transmit path and the receive path for a remote ADSL communication terminal.

FIG. 6A is a block diagram illustrating the transmit path and the receive path for a remote ADSL communication terminal. A DMT encoder encodes a digital signal that is input to a DAC 601. The output of DAC 601 is connected to both a first switch 602 and a second switch 604. A timing diagram for the output of the DAC and for switches 602 and 604 is provided in FIG. 6B. When switch 602 is closed, the output of DAC 601 is connected to a transmitter 612 that sends the upstream transmission from the DAC to a hybrid 620 that is connected to an ADSL line 622. It should be noted that the transmitters generally include a reconstruction filter and a programmable attenuator that conditions the output of the DAC for transmission over an ADSL line. It should be understood that when the DAC is described as connected to the transmitter or the transmitter is described as connected to an ADSL line, that such a description is intended to cover cases where such connections are made either directly or through intermediate filters or devices that condition the signal such as attenuators.

Similarly, when switch 604 is closed, the output of DAC 601 is connected to an echo cancellation filter 614. The output of echo cancellation filter 614 is inverted and fed to an adder 624 that also receives incoming downstream transmissions from the central office through hybrid 620. The echo cancellation signal is added to the receive signal and the resulting signal is input to a receiver 630 which is connected to an ADC 632.

Figure 6B:
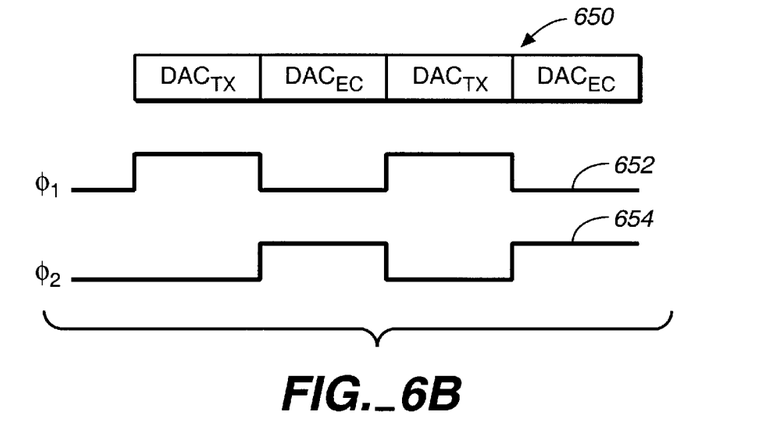
FIG. 6B shows the time division multiplexed output of a DAC and the state of two switches.

FIG. 6B shows the time division multiplexed output of DAC 601 and the state of switch 602 and switch 604. The output 650 of DAC 601 alternates between values that correspond to the signal being transmitted and the echo cancellation signal. A signal 652 represents the state of switch one. When signal 652 is high, the output of the DAC corresponds to the upstream transmitted signal. A signal 654 corresponds to the state of switch 604. When signal 654 is high, the output of DAC 601 corresponds to the echo cancellation signal.

Thus, DAC 601 is time division multiplexed to provide both the upstream transmission signal as well as an echo cancellation signal used to cancel leakage of the upstream transmission signal into the downstream receive signal path. It should be noted that in one embodiment a DAC is selected that outputs a signal at a frequency of 4.416 MHz. This output rate is more than sufficient to provide an output at a frequency that is more than four times the upstream data rate of 138 kHz (or 276 kHz for ISDN lines in Europe). The inclusion of only one DAC in the remote unit lowers the chip costs of the unit.

Figure 6C:
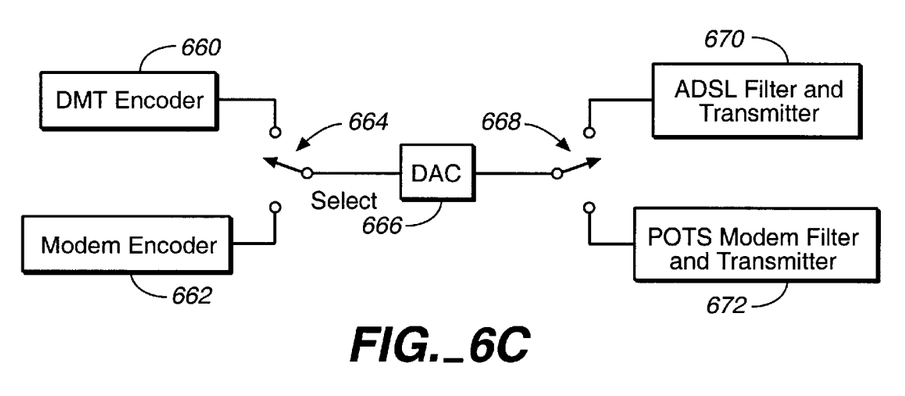
FIG. 6C is a block diagram illustrating a multiplexed DAC that is used to process an ADSL signal and a modem signal for a remote unit.

In addition to using a multiplexed DAC for the purpose of processing an echo canceling signal, a multiplexed DAC may also be used to process a voice band POTS modem signal or other modulated signal to be sent from the remote unit on another line. FIG. 6C is a block diagram illustrating a multiplexed DAC that is used to process an ADSL signal and a modem signal for a remote unit. A DMT encoder 660 encodes a digital signal that is selectively input by a switch 664 to a DAC 666. A modem encoder 662 also encodes a digital signal that is selectively input by switch 664 to DAC 666. The output of DAC 666 is selectively connected by a switch 668 to an ADSL filter and transmitter 670 or to a POTS modem filter and transmitter 672. It should be noted that the filters and transmitters may be separate in some embodiments and that a programmable gain amplifier or programmable attenuator may also be used. Switch 664 and switch 668 are synchronized so that DMT encoder 660 is connected to the DAC input when the DAC output is connected to ADSL transceiver 670 and modem encoder 662 is connected to DAC input when POTS modem 672 is connected to the DAC output.

Figure 6D:
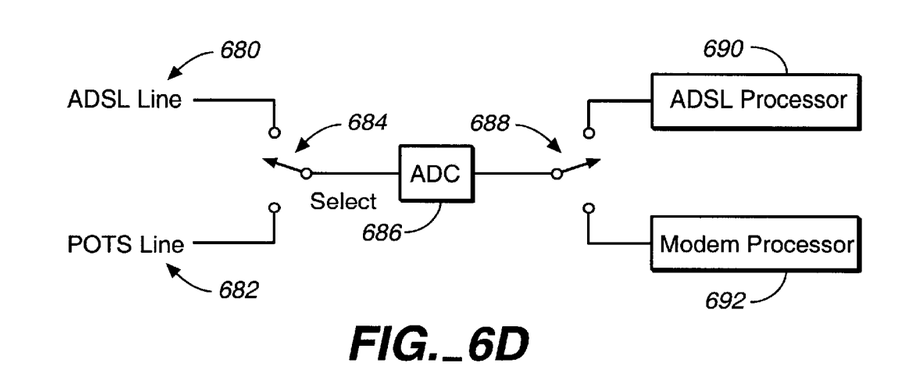
FIG. 6D is a block diagram illustrating a multiplexed ADC that is used to process both a received ADSL signal and a modem signal for a remote unit.

Similarly, a multiplexed ADC may be used to process a received POTS modulated signal or other modulated signal sent to the remote unit on one line and an ADSL sent to the remote unit on another line. FIG. 6D is a block diagram illustrating a multiplexed ADC that is used to process both a received ADSL signal and a modem signal for a remote unit. An ADSL line and a POTS line are selectively connected by a switch 684 to an ADC 686. It should be noted that the ADSL line and the POTS line are generally connected to the ADC through a series of filters and/or programmable gain amplifiers or programmable attenuators. That is, the ADSL line and the POTS line may be connected to the ADC directly through switch 684 or indirectly through such other devices. The output of ADC 686 is selectively output to an ADSL processor 690 and a modem processor 692. Switch 684 and switch 688 are synchronized so that ADSL line 680 is connected to the ADC input when the ADC output is connected to ADSL processor 690 and POTS line 682 is connected to the ADC input when modem processor 692 is connected to the ADC output.

A system and method for using only a single DAC to provide both an upstream transmitted signal and a downstream echo cancellation signal in an ADSL system has been disclosed. A single DAC and ADC are also provided at a remote unit for processing both ADSL and POTS signals. A system and method for using only a single ADC to process input from more than one ADSL line coming into a central office has been disclosed as well.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An ADSL central office transmission system for transmitting downstream DMT signals to a plurality of remote ADSL transceiver units comprising:
    a DMT digital signal transceiver that generates a time division multiplexed digital signal that includes a plurality of DMT signals to be sent on a plurality of ADSL lines;
    a digital to analog converter that converts the time division multiplexed digital signal into a time division multiplexed analog signal that includes a plurality of analog DMT signals, the digital to analog converter having an output that outputs the time division multiplexed analog signal;
    a switch that selectively connects the output of the digital to analog converter to each of a plurality of transmitters, wherein the transmitters are configured to drive the plurality of ADSL lines;
    whereby the plurality of ADSL lines are driven by the plurality of analog DMT signals.

2. A method of transmitting a plurality of downstream DMT signals from a central office comprising:
    generating a time division multiplexed digital signal that includes a plurality of digital DMT signals;
    converting the time division multiplexed digital signal into a time division multiplexed analog signal that includes a plurality of analog DMT signals;
    selectively connecting the time division multiplexed analog signal to each of a plurality of transmitters; and
    driving a plurality of ADSL lines with the plurality of transmitters.

3. An ADSL remote transceiver for receiving DMT signals from a central office and for transmitting DMT signals to the central office comprising:
    a DMT digital signal encoder that generates a digital DMT signal to be sent to the central office;
    a digital to analog converter having a digital to analog converter input and a digital to analog converter output, wherein the digital to analog converter input is configured to receive the digital DMT signal to be sent to the central office and wherein the digital to analog converter output is configured to output an analog transmission signal for transmission to the central office and configured to output an analog echo cancellation signal distinct from the analog transmission signal for canceling echoes caused by leakage from the analog transmission signal in a received signal from the central office.

4. An ADSL remote transceiver for receiving DMT signals from a central office and for transmitting DMT signals to the central office as recited in claim 3 wherein the output of the digital to analog converter is time division multiplexed between a transmitter and an echo cancellation circuit.

5. An ADSL remote transceiver for receiving DMT signals from a central office and for transmitting DMT signals to the central office as recited in claim 3 further including:
    a transmitter having a transmitter input connected to the digital to analog converter output and an output for driving an ADSL line;
    an echo cancellation filter having an input connected to the digital to analog converter output, the echo cancellation filter also having an echo cancellation filter output;
    a combiner having a first combiner input connected to the echo cancellation filter output, the combiner also having a second combiner input connected to receive a signal from the ADSL line, the combiner also having a combiner output;

a receiver having an input connected to the combiner output.

6. An ADSL remote transceiver for receiving DMT signals from a central office and for transmitting DMT signals to the central office as recited in claim 5 wherein the transmitter includes a reconstruction filter.

7. An ADSL remote transceiver for receiving DMT signals from a central office and for transmitting DMT signals to the central office as recited in claim 5 wherein the transmitter includes a reconstruction filter and a programmable attenuator.

8. An ADSL remote transceiver for receiving DMT signals from a central office and for transmitting DMT signals to the central office as recited in claim 5 wherein a first switch connects the digital to analog converter output to the transmitter input and a second switch connects the digital to analog converter output to the echo cancellation filter.

9. An ADSL remote transceiver for receiving DMT signals from a central office and for transmitting DMT signals to the central office as recited in claim 8 wherein the first switch is open when the second switch is closed and the first switch is closed when the second switch is open.

10. An ADSL remote transceiver for receiving DMT signals from a central office and for transmitting DMT signals to the central office as recited in claim 5 wherein the transmitter output and the combiner input are connected to the ADSL line using a hybrid.

11. A method of receiving DMT signals from a central office and for transmitting DMT signals to the central office comprising:

generating a digital DMT signal to be sent to the central office;

converting the digital DMT signal to be sent to the central office to an analog DMT transmission signal and to an analog echo cancellation signal for correcting errors caused by leakage from the analog DMT transmission signal in a received signal from the central office;

generating a time division multiplexed analog output that includes the analog DMT transmission signal and the analog echo cancellation signal; and selectively connecting the time division multiplexed analog output to an ADSL transmission line and to an echo cancellation circuit.

12. An ADSL central office reception system for receiving upstream DMT signals said system comprising:

a plurality of receivers connectable to a plurality of ADSL lines;

a switch having a plurality of switch inputs connected to the plurality of receivers and a switch output;

an analog to digital converter connected to said switch output that converts a plurality of receiver signals from the plurality of receivers into a time division multiplexed digital signal that includes a plurality of DMT signals, the plurality of DMT signals being derived from the plurality of receiver signals from the plurality of receivers; and a DMT digital signal transceiver that receives the time division multiplexed digital signal;

whereby the plurality of upstream DMT signals are processed by the analog to digital converter.

13. A remote unit configured to transmit both an ADSL signal and a POTS modulated signal comprising:

a DAC having an input and an output;

a DMT encoder selectively connected to the input of the DAC;

a POTS modem encoder selectively connected to the input of the DAC in a complementary manner such that when the DMT encoder is connected to the input of the DAC, the POTS modem encoder is not connected to the input of the DAC and when the POTS modem encoder is connected to the input of the DAC the DMT encoder is not connected to the input of the DAC;

an ADSL transmitter and a POTS modem selectively connected to the output of the DAC so that when the DMT encoder is connected to the input of the DAC, the ADSL transmitter is connected to the output of the DAC and when the POTS modem encoder is connected to the input of the DAC, the POTS modem is connected to the output of the DAC.

14. A remote unit configured to receive both a DMT signal from an ADSL central office and a modulated POTS signal comprising:

an ADC having an input and an output;

an ADSL line selectively connected to the input of the ADC;

a POTS line selectively connected to the input of the ADC in a complementary manner such that when the ADSL line is connected to the input of the ADC, the POTS line is not connected to the input of the ADC and when the POTS line is connected to the input of the ADC, the ADSL line is not connected to the input of the ADC;

an ADSL processor and a modem processor selectively connected to the output of the ADC so that when the ADSL line is connected to the input of the ADC, the ADSL processor is connected to the output of the ADC and when the POTS line is connected to the input of the ADC, the modem processor is connected to the output of the ADC.

15. A central office transmission system for transmitting downstream signals to a plurality of remote transceiver units comprising:

a digital signal transceiver that generates a time division multiplexed digital signal that includes a plurality of signals to be sent on a plurality of lines;

a digital to analog converter that converts the time division multiplexed digital signal into a time division multiplexed analog signal that includes a plurality of analog signals, the digital to analog converter having an output that outputs the time division multiplexed analog signal;

a switch that selectively connects the output of the digital to analog converter to each of a plurality of transmitters, wherein the transmitters are configured to drive the plurality of lines;

whereby the plurality of lines are driven by the plurality of analog DMT signals.

16. A central office transmission system as recited in claim 15 wherein the transmitted signals are ADSL signals.

17. A central office transmission system as recited in claim 15 wherein the transmitted signals are HDSL signals.

18. A central office transmission system as recited in claim 15 wherein the transmitted signals are SDSL signals.

19. A central office transmission system as recited in claim 15 wherein the transmitted signals are ADSL-lite signals.

20. A central office transmission system as recited in claim 15 wherein the transmitted signals include ADSL signals and POTS signals.

21. An ADSL central office transmission system for transmitting downstream DMT signals to a plurality of remote ADSL transceiver units comprising:
- a communication line that carries a time division multiplexed digital signal that includes a plurality of DMT signals to be sent on a plurality of ADSL lines;
- a digital to analog converter that converts the time division multiplexed digital signal into a time division multiplexed analog signal that includes a plurality of analog DMT signals, the digital to analog converter having an output that outputs the time division multiplexed analog signal;
- a switch that selectively connects the output of the digital to analog converter to each of a plurality of transmitters, wherein the transmitters are configured to drive the plurality of ADSL lines;
- whereby the plurality of ADSL lines are driven by the plurality of analog DMT signals.

22. An ADSL central office transmission system for transmitting downstream DMT signals to a plurality of remote ADSL transceiver units as recited in claim 21 wherein the time division multiplexed digital signal is generated from a plurality of digital signals.

23. An ADSL central office transmission system for transmitting downstream DMT signals to a plurality of remote ADSL transceiver units as recited in claim 21 wherein the time division multiplexed digital signal is generated from a plurality of digital signals generated by a single transceiver.

24. An ADSL central office transmission system for transmitting downstream DMT signals to a plurality of remote ADSL transceiver units as recited in claim 21 wherein the time division multiplexed digital signal is generated from a plurality of digital signals generated by a plurality of transceivers.

* * * * *